US007323701B2

(12) United States Patent
Vaudrevange et al.

(10) Patent No.: US 7,323,701 B2
(45) Date of Patent: Jan. 29, 2008

(54) GAS DISCHARGE LAMP

(75) Inventors: Dominik Vaudrevange, Aachen (DE); Klaus Bergmann, Herzogenrath (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 74 days.

(21) Appl. No.: 10/525,136

(22) PCT Filed: Aug. 11, 2003

(86) PCT No.: PCT/IB03/03657

§ 371 (c)(1),
(2), (4) Date: Nov. 7, 2005

(87) PCT Pub. No.: WO2004/019662

PCT Pub. Date: Mar. 4, 2004

(65) Prior Publication Data

US 2006/0113498 A1 Jun. 1, 2006

(30) Foreign Application Priority Data

Aug. 21, 2002 (DE) ............................... 102 38 096

(51) Int. Cl.
*G01J 3/10* (2006.01)

(52) U.S. Cl. .................................................. 250/504 R

(58) Field of Classification Search ............ 250/504 R, 250/214.1; 313/618, 356; 378/119, 34
See application file for complete search history.

(56) References Cited

U.S. PATENT DOCUMENTS

| | | | | |
|---|---|---|---|---|
| 5,504,795 | A | 4/1996 | McGeoch | |
| 5,639,309 | A * | 6/1997 | Akimoto | 118/723 MP |
| 6,139,384 | A * | 10/2000 | DeTemple et al. | 445/24 |
| 6,232,613 | B1 | 5/2001 | Shimkaveg et al. | |
| 6,389,106 | B1 * | 5/2002 | Neff et al. | 378/122 |
| 6,414,438 | B1 * | 7/2002 | Borisov et al. | 315/111.31 |
| 6,695,665 | B2 * | 2/2004 | Devir | 445/44 |
| 6,700,326 | B1 * | 3/2004 | Devir | 313/631 |
| 6,788,763 | B1 * | 9/2004 | Neff et al. | 378/119 |
| 6,894,298 | B2 * | 5/2005 | Ahmad et al. | 250/504 R |
| 2003/0068012 | A1 * | 4/2003 | Ahmad et al. | 378/119 |
| 2006/0138960 | A1 * | 6/2006 | Derra et al. | 313/618 |
| 2007/0045573 | A1 * | 3/2007 | Kleinschmidt et al. | 250/504 R |

FOREIGN PATENT DOCUMENTS

| | | |
|---|---|---|
| WO | WO9929145 A1 | 6/1999 |
| WO | WO0101736 A1 | 1/2001 |
| WO | WO0207484 A1 | 1/2002 |

* cited by examiner

*Primary Examiner*—Robert Kim
*Assistant Examiner*—Johnnie L Smith, II

(57) ABSTRACT

A gas discharge lamp for the wavelength range of extreme ultraviolet radiation and/or soft X-ray radiation has at least two electrodes for providing a radiaton-emitting plasma in the intervening discharge space. One of the electrodes has a continuous opening to an adjoining outer region where charge carriers can be generated which can be transported through the opening in to the discharge space. The electrode opening narrows in the direction of the outer region.

10 Claims, 7 Drawing Sheets

Figure 1:
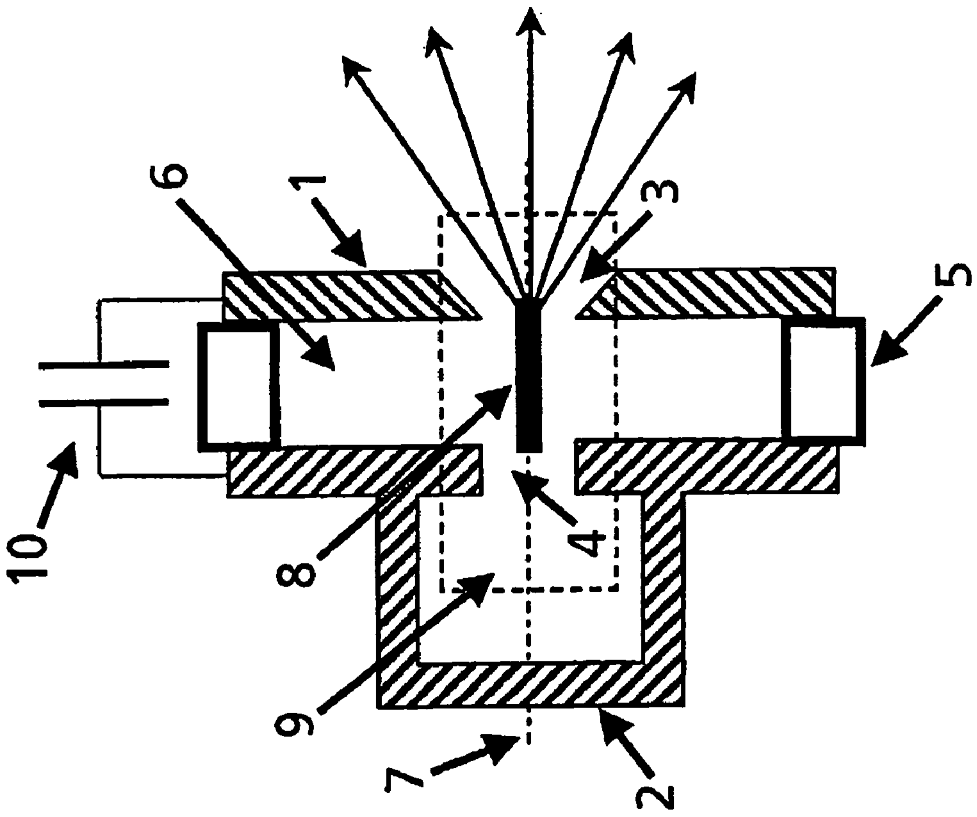
Figure 2:
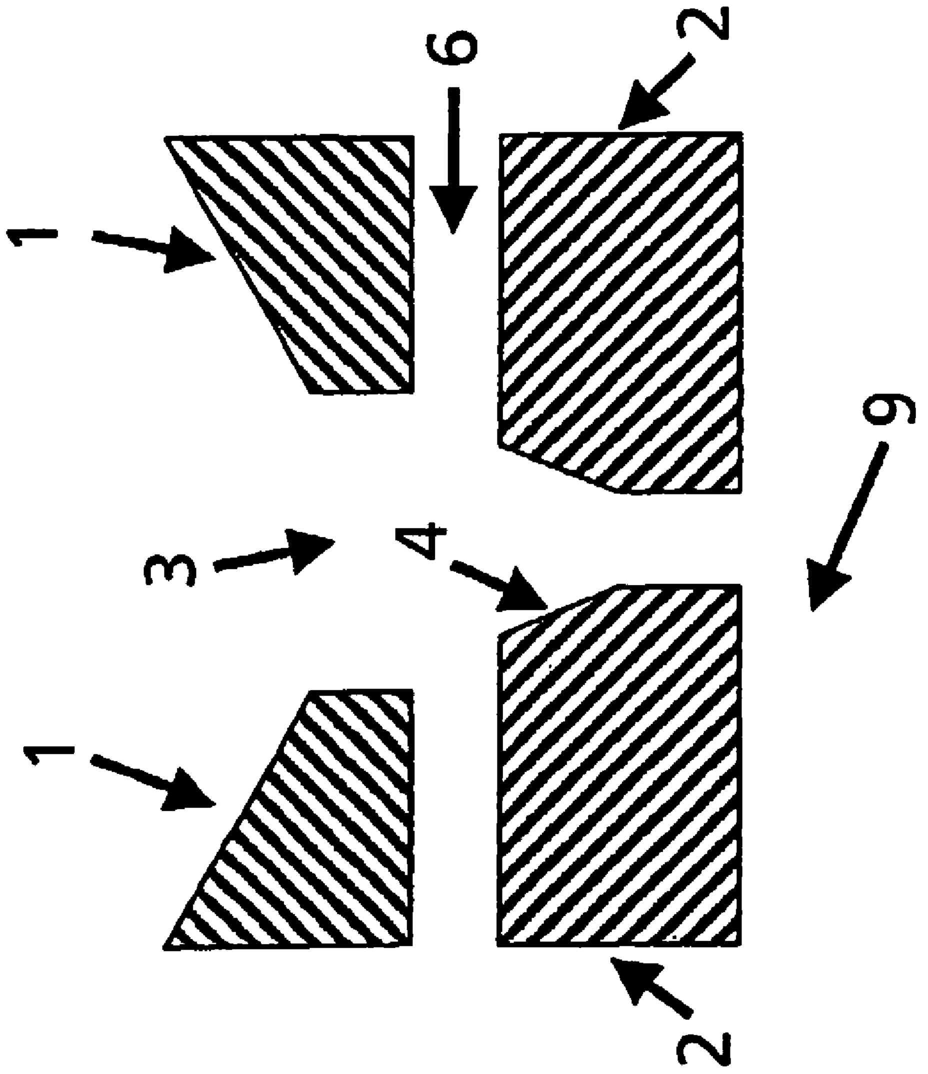

Fig. 1 Stand der Technik

GAS DISCHARGE LAMP

The invention relates to a gas discharge lamp for generating extreme ultraviolet and/or soft X-ray radiaton. Preferred fields of applications are those which require extreme ultraviolet (EUV) radiation or soft X-ray radiation in a wavelength range of approximately 1 to 20 nm, in particular around 13 nm, for example EUV lithography or X-ray microscopy.

The invention relates to a gas discharge lamp for generating extreme ultraviolet and/or soft X-ray radiation as defined in the pre-characterizing section of claim 1. Preferred fields of application are those which require extreme ultraviolet (EUV) radiation or soft X-ray radiation in a wavelength range of approximately 1 to 20 nm, in particular around 13 nm, for example EUV lithography or X-ray microscopy.

It is generally known to use a dense hot plasma as a radiation-emitting medium for generating EUV and/or soft X-ray radiation. The gas discharge lamp is then typically formed by an electrode system with an anode and a cathode, which system is connected to a current pulse generator. The discharge space situated between the electrodes is filled with a gas at a pressure in a range of approximately 1 Pa to 100 Pa. A so-termed pinch plasma arises in the discharge space owing to a pulsed current with current strengths in an adjusted kiloampere range of up to a maximum of 100 kA and pulse durations in a range from 10 ns up to a few hundreds of ns, which plasma is brought to temperatures of a few tens of eV and to densities by the pulse current, through ohmic heating and compression, such that it emits a radiation characteristic of the functional gas that is used in the spectral range that is of interest.

It is necessary to introduce charge carriers into the discharge space between the anode and the cathode or to generate them there in order to make the radiation-emitting plasma available. Suitable means for pre-ionization of a gas are necessary for this, such as, for example, a surface discharge trigger, a highly dielectric trigger, a ferroelectric trigger, or a glow discharge trigger.

It is furthermore known to make charge carriers available via a hollow-cathode plasma, as is diagrammatically shown in FIG. 1. The electrode system is formed by an anode 1 and a cathode 2 here, with respective mutually opposed openings 3 and 4 and an electrical insulator 5 located between them. A plasma channel 8 is present in the discharge space 6 on the axis of symmetry 7 which is shown with a broken line. The plasma emits the radiation, which is indicated by the arrows. The cathode 2 furthermore comprises a hollow space 9 in which charge carriers, such as in particular electrons, are generated by suitable pre-ionization means.

As an alternative to the active provision of starting electrons by pre-ionization means, an operation may be provided in which the starting electrons are created by spontaneous breakdown. The spontaneous breakdown may here be controlled by a trigger electrode in the space 9, whereby the radiation pulses can be accurately triggered in time. A gas pressure of approximately 1 Pa to 100 Pa is then present in the discharge space 6. The gas pressure and the geometry of the electrodes are chosen such that the ignition of the plasma takes place on the left-hand branch of the Paschen curve. Ignition then takes place in the region of the long electric field lines which occur in the region of the bores 3 and 4. To make the radiation-emitting plasma available, an ionization of the gas takes place first along the field lines in the bore region. This phase provides the conditions necessary for forming a plasma in the hollow cathode, hence the name hollow-cathode plasma. This plasma subsequently leads to a low-ohmic channel in the space between the electrodes. A pulsed current is passed through this channel, which current is generated through the discharge of stored electrical energy in a capacitor bank 10. The current causes a compression and heating of the plasma, such that conditions required for the efficient emission of radiation in the EUV range characteristic of the discharge gas used are achieved.

Gas discharge lamps operating in accordance with this principle are described, for example, in WO 99/29145 A1 and WO 01/01736 A1. The latter publication provides various additional measures for increasing the efficacy of conversion of the supplied electrical energy into radiation energy, among them the choice of a non-continuous opening of conical cross-section in the anode. This geometrical arrangement of the anode recess is said to increase the radiant efficacy.

WO 02/07484 A2 discloses a gas discharge lamp in which a pinch plasma is created on an axis of symmetry, which plasma emits the radiation in the relevant spectral range. The publication teaches how a pre-ionization is achieved in an outer region by means of a pulsed surface discharge, whereupon the charge carriers thus created are to reach the discharge region via an axial aperture in one of the electrodes. It is provided here that the pre-ionization region is not in optical communication with the axis of the pinch plasma channel.

The invention has for its object to solve the technical problem of providing a gas discharge lamp with a plasma emitting in the EUV and/or soft X-ray wavelength range which has an improved stability of its radiation emission.

The invention is based on the recognition that the above technical problem is solved through the provision of a gas discharge lamp in which the continuous electrode opening narrows in the direction of the outer region. In other words, the diameter of the electrode opening should be greater at the side facing the discharge space than at the side facing away from the discharge space.

The outer region is to be understood to be that spatial region in which charge carriers can be generated, which can then be transported through the continuous opening into the discharge space.

The invention is based on the recognition that an increase in the stability of the radiation emission, i.e. an improved constancy in the emission from one pulse to another, is achieved in that the processes in the gas discharge space and in the outer region are disconnected from one another as much as possible. The pre-ionization processes in the outer region for generating charge carriers in fact influence the discharge process in the central space and destabilize the radiation emission.

It was found that the disadvantage of a discharge build-up in the discharge space between the anode and cathode before the envisaged holding voltage has been reached, i.e. the so-termed spontaneous breakdown, can be reduced in that fewer charge carriers are transported from the outer region, for example from the hollow cathode, into the central space between the electrodes. This purpose is served by the continuous opening in the electrode, whether anode or cathode, which narrows in the direction of the outer region.

The voltage stability of the electrode system improved in this manner furthermore renders possible an increase in the maximum repetition frequency or maximum repetition rate.

The gas discharge lamp according to the invention may be used either in the spontaneous breakdown mode, or alternatively additional means may be provided for pre-ionization. Such an ignition device is capable of achieving that the radiation pulses are accurately triggered in time, should the application require this.

The narrowing cathode opening may be of various geometrical shapes. This is shown in the preferred embodiments of FIGS. 2 to 7, which show the region surrounded by broken lines in FIG. 1 on an enlarged scale. The region shown enlarged in FIGS. 2 to 7 has been rotated clockwise through 90° with respect to FIG. 1.

Figure 3:
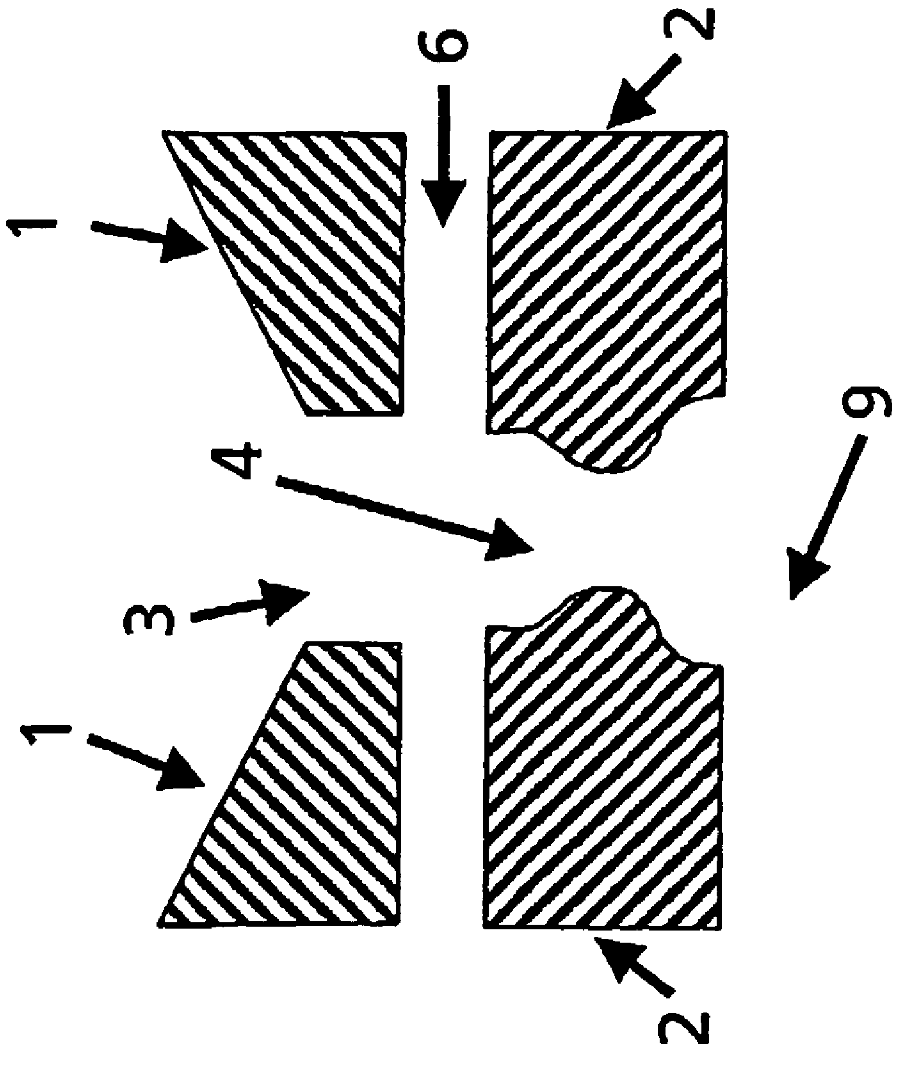
Figure 4:
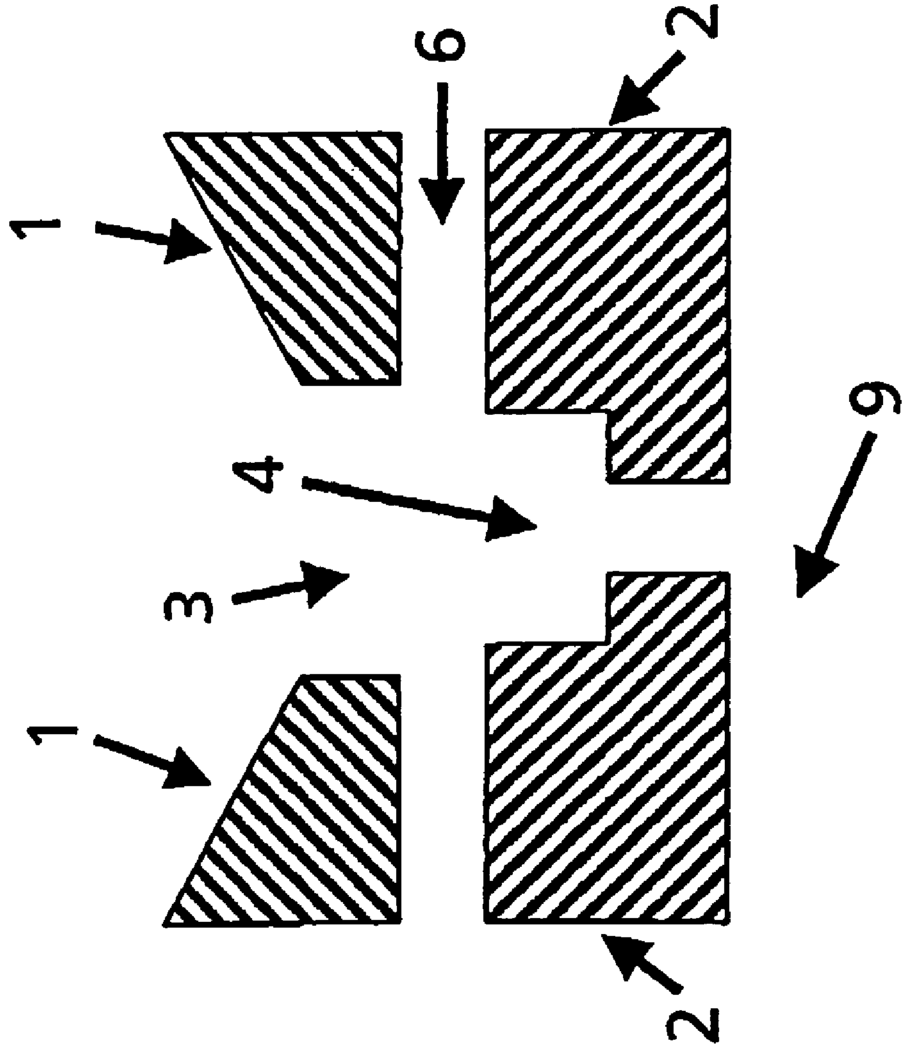
Figure 5:
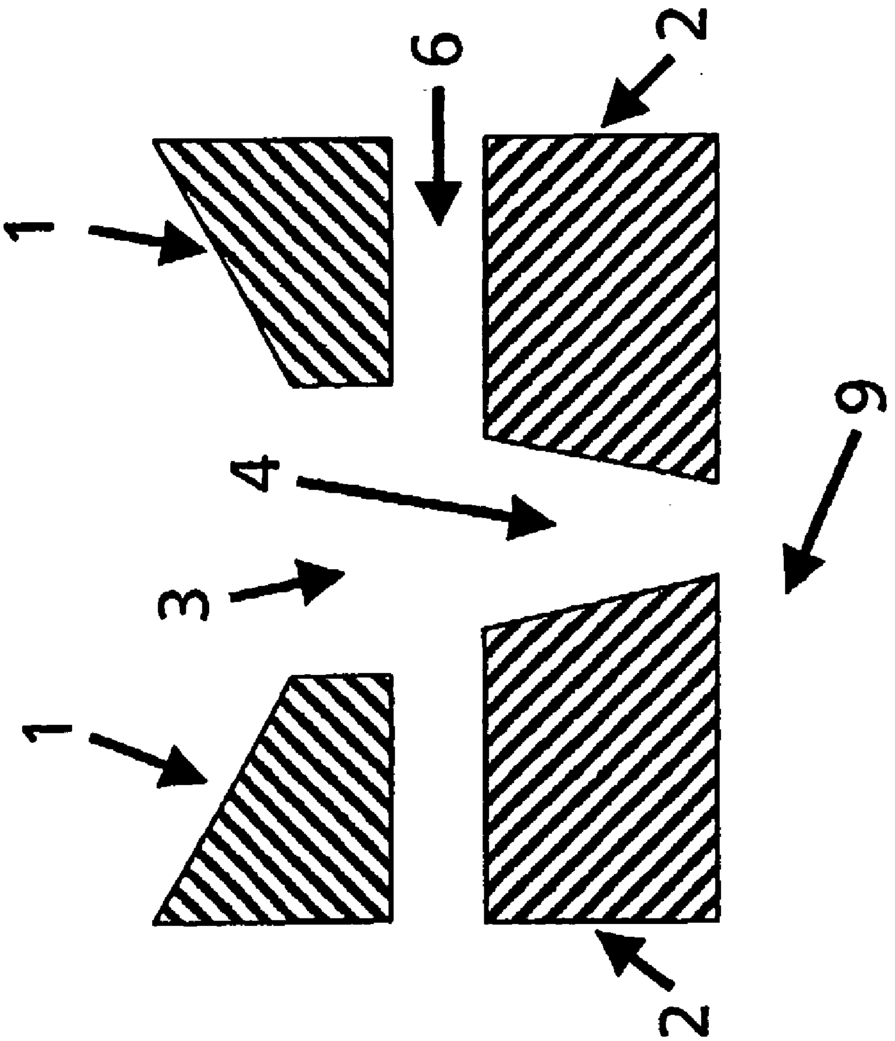
Figure 6:
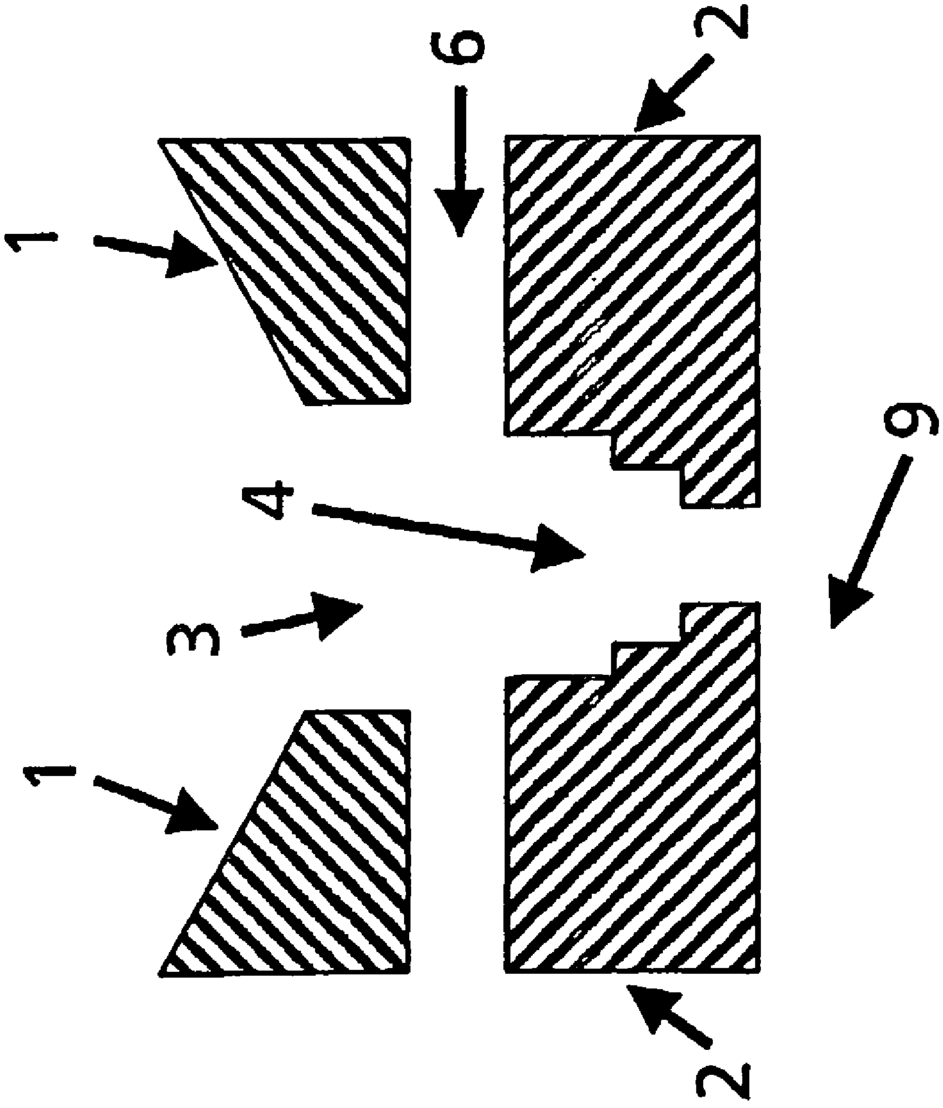
Figure 7:
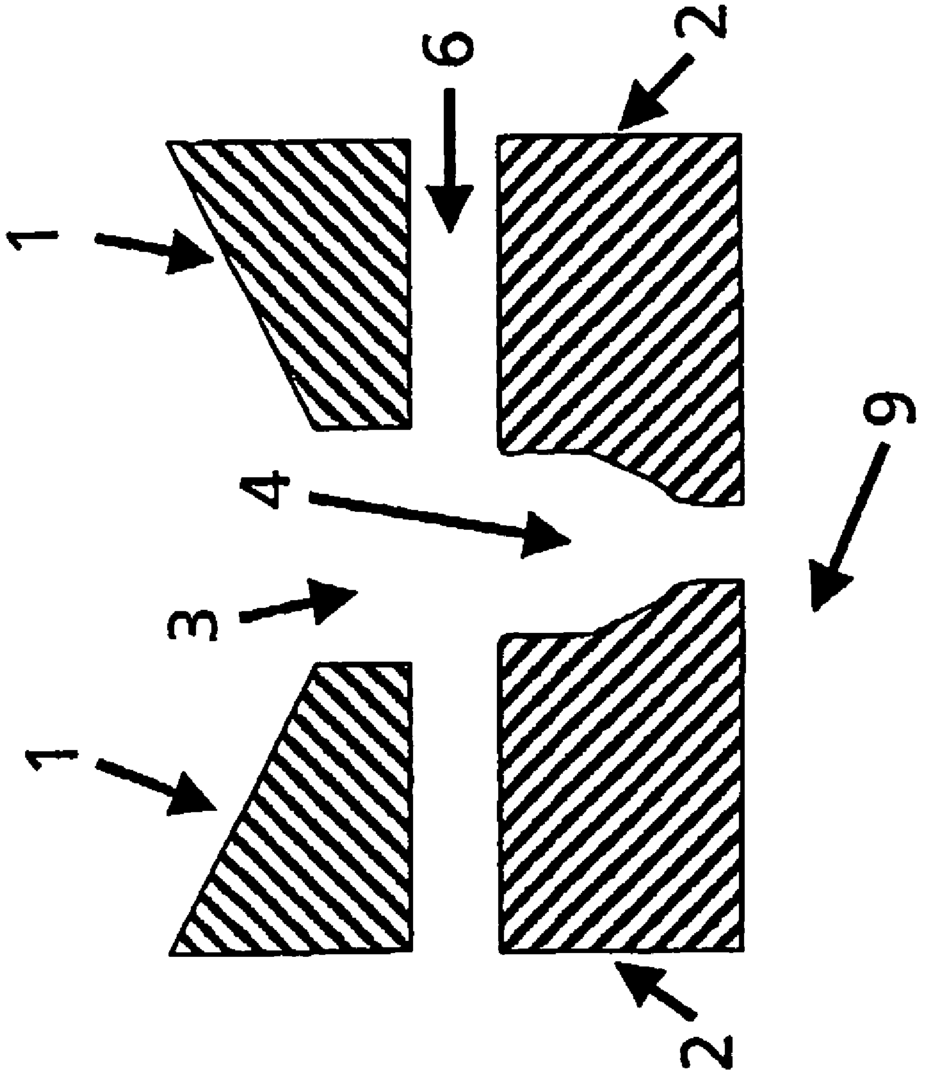

Continuous or stepped transitions in the opening of FIGS. 2 and 4 to 7 are possible, as is the provision of an opening with a restriction, cf. FIG. 3, i.e. a diameter reduction followed by a diameter increase.

An electrode opening narrowing in the direction of the outer region, furthermore, has advantages as regards the erosion of the electrode surface. The generation of a pinch plasma in fact converts pulsed energies of typically a few joules into several tens of joules. A substantial proportion of this energy is concentrated in the pinch plasma, which leads to a thermal load on the electrodes. The thermal load here arises through the emission of radiation and of hot particles such as, for example, ions. To clarify this situation, it is noted that the distance between anode and cathode is typically only a few millimeters, and the diameter of the electrode opening at the discharge side is typically between 8 mm and 20 mm.

The cathode is preferably constructed as a hollow cathode comprising the continuous, narrowing opening. In this case the hollow space of the hollow cathode is connected to the discharge space such that gas can be supplied. This renders possible the ignition of a hollow cathode plasma.

A distance between the electrode surface and the pinch plasma which is as large as possible would be advantageous for reducing the thermal load. Typical diameters for the opening of the two electrodes lie in a range of a few millimeters up to a few tens of millimeters. The choice of larger openings, however, would increasingly have the result that no pinch plasma can be generated anymore which emits in the envisaged spectral range of EUV and/or soft X-radiation, because the achievable plasma temperature becomes lower in proportion as the diameter becomes larger. In addition, the anode opening should be chosen to be as large as possible also in order that the radiation coupled out from the anode opening is optically as accessible as possible also from wide observation angles to the pinch plasma.

Experiments have shown that it is useful to choose the diameter of the cathode opening such that it narrows towards the outer region by approximately a factor of 2.

It may furthermore be provided that the cathode is made from a material in its opening region other than that in the other regions of the cathode. Thus the opening region may comprise, for example, a low-erosion material such as tungsten, molybdenum, or some other low-erosion alloy, so as to realize a lesser abrasion or erosion. The remaining regions of the cathode may comprise a material of good thermal conductivity such as, for example, copper.

A further aspect of the invention is found in that the anode opening has a smaller diameter at the side facing the discharge space than the cathode opening. In a gas discharge operated on the left-hand branch of the Paschen curve, in fact, this leads to longer electrical field lines in that said field lines now reach into the opening, for example up to the step in the cathode opening of FIG. 4. This renders it possible to reduce the gas pressure in the discharge space, which in its turn renders possible an increase in the repetition frequency of the gas discharge lamp. The increase in the repetition frequency leads to a larger amount of radiation energy that can be emitted.

In a further embodiment of the invention, the use of a narrowing cathode opening allows a simpler mode of operation of the gas discharge lamp. The expert has to choose a total of two diameters in the case of a narrowing cathode opening, i.e. the cathode opening diameter at the side facing the discharge space and the cathode opening diameter at the side facing the outer region. Depending on the choice of the two diameters, the expert obtains a further degree of freedom in the operation of the equipment, whereby it becomes easier for him to choose suitable operating parameters.

It may indeed occur, depending on the requirements of the application in question, that a higher operating pressure is necessary. A cathode opening which narrows in a direction from the discharge space towards the outer region leads to a higher operating pressure in many cases, so that the expert in such a case is capable of maximizing the EUV output for a given pulse energy.

In other experimental situations, however, the exact opposite may be required, i.e. it may be required to reduce the operating pressure. This may be clarified in that the maximum achievable repetition rate typically is a function of the time in which the charge carriers of the plasma recombine. It was shown in experiments that the increase in the cathode diameter renders it possible to choose a lower operating pressure, and this renders possible a higher repetition rate. Overall, therefore, a simpler adjustment of the operating parameters will be possible in dependence on requirements specific to the application.

The invention claimed is:

1. A gas discharge lamp for a wavelength range of at least one of extreme ultraviolet radiation and soft X-ray radiation comprising:

a discharge space;

at least two electrodes for generating a radiation-emitting plasma in the discharge space; and an outer region;

wherein a first electrode of said electrodes is near a side where the radiation is emitted, and a second of said electrodes opposite said first electrode has an opening to the outer region such that charge carriers can be generated in said outer region and can be transported through said opening into the discharge space, and wherein the opening narrows in a direction from the discharge space to the outer region.

2. The gas discharge lamp as claimed in claim 1, further comprising means for a pre-ionization of gas in the outer region.

3. A gas discharge lamp, for a wavelength range of at least one of extreme ultraviolet radiation and soft X-ray radiation comprising:

a discharge space;

at least two electrodes for generating a radiation-emitting plasma in the discharge space; and an outer region;

wherein one of said at least two electrodes has an opening to the outer region such that charge carriers can be generated in said outer region and can be transported through said opening into the discharge space, and wherein the opening narrows in a direction from the discharge space to the outer region;

wherein a first portion of at least one of the two electrodes is manufactured from a material which is less prone to erosion than a remaining portion.

4. The gas discharge lamp as claimed in claim 1, wherein the opening is provided with a continuous or stepped transition.

5. The gas discharge lamp as claimed in claim 1, wherein a constriction is present inside the opening.

6. A gas discharge lamp:

a discharge space;

an outer region;

a first electrode in the discharge space near a side where radiation is emitted;

a second electrode opposite the first electrode, the second electrode having an opening to the outer region such that charge carriers can be generated in the outer region and can be transported through the opening into the discharge space, and wherein the opening narrows in a direction from the discharge space to the outer region.

7. The gas discharge lamp of claim 6, further comprising means for a pre-ionization of gas in the outer region.

8. The gas discharge lamp of claim 6, wherein a first portion of at least one of the first electrode and the second electrode is manufactured from a material which is less prone to erosion than a remaining portion.

9. The gas discharge lamp of claim 6, wherein the opening is provided with a continuous or stepped transition.

10. The gas discharge lamp of claim 6, wherein a constriction is present inside the opening.

* * * * *